US010391988B2

(12) United States Patent
Englert et al.

(10) Patent No.: US 10,391,988 B2
(45) Date of Patent: Aug. 27, 2019

(54) METHOD FOR OPERATING AN AUTOMATED PARKING BRAKE

(71) Applicant: Robert Bosch GmbH, Stuttgart (DE)

(72) Inventors: Andreas Englert, Untergruppenbach (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/656,890

(22) Filed: Jul. 21, 2017

(65) Prior Publication Data

US 2018/0029573 A1 Feb. 1, 2018

(30) Foreign Application Priority Data

Jul. 26, 2016 (DE) ........................ 10 2016 213 666

(51) Int. Cl.
*B60T 7/12* (2006.01)
*B60T 13/58* (2006.01)
(Continued)

(52) U.S. Cl.
CPC .............. *B60T 8/245* (2013.01); *B60T 7/042* (2013.01); *B60T 7/12* (2013.01); *B60T 8/171* (2013.01);
(Continued)

(58) Field of Classification Search
CPC ... B60T 8/245; B60T 8/40; B60T 8/48; B60T 7/12; B60T 7/122; B60T 13/66;
(Continued)

(56) References Cited

U.S. PATENT DOCUMENTS 6,311,808 B1 * 11/2001 Halasy-Wimmer ..... B60R 25/08 188/106 F
7,681,961 B2 * 3/2010 Nonaga ................ B60T 13/746 188/162
(Continued)

FOREIGN PATENT DOCUMENTS

DE 10 2009 047 127 A1 5/2011
DE 10 2015 208 165 A1 4/2016
(Continued)

OTHER PUBLICATIONS

EPO translation, FR 2928327 A1, Blanc et al., Sep. 2009. (Year: 2009).*

*Primary Examiner* — Thomas J Williams
(74) *Attorney, Agent, or Firm* — Maginot, Moore & Beck LLP

(57) ABSTRACT

A method for operating an automated parking brake in a motor vehicle, having a hydraulic actuator for producing a hydraulic force component and an electromechanical actuator for producing an electromechanical force component, includes superimposing the hydraulic force component and the electromechanical force component to obtain a total clamping force for a parking brake operation, and maintaining the total clamping force by self-locking of the parking brake. The method further comprises during the parking brake operation, setting at least one defined hydraulic pressure level using the hydraulic actuator, and locking-in a defined hydraulic pressure level with a valve when the at least one defined hydraulic pressure level is reached.

11 Claims, 4 Drawing Sheets

(51) Int. Cl.

| | |
|---|---|
| ***B60T 8/24*** | (2006.01) |
| ***B60T 8/171*** | (2006.01) |
| ***B60T 8/172*** | (2006.01) |
| ***B60T 13/66*** | (2006.01) |
| ***B60T 13/68*** | (2006.01) |
| ***B60T 13/74*** | (2006.01) |
| ***B60T 7/04*** | (2006.01) |
| ***B60T 13/14*** | (2006.01) |
| *B60T 8/32* | (2006.01) |
| *B60T 8/48* | (2006.01) |

(52) U.S. Cl.
CPC ............ *B60T 8/172* (2013.01); *B60T 13/146* (2013.01); *B60T 13/588* (2013.01); *B60T 13/662* (2013.01); *B60T 13/686* (2013.01); *B60T 13/741* (2013.01); *B60T 13/746* (2013.01); *B60T 7/122* (2013.01); *B60T 8/32* (2013.01); *B60T 8/4872* (2013.01); *B60T 2201/06* (2013.01)

(58) Field of Classification Search
CPC ...... B60T 13/662; B60T 13/68; B60T 13/686; B60T 13/741; B60T 13/746; B60T 13/58; B60T 13/588
See application file for complete search history.

(56) References Cited

U.S. PATENT DOCUMENTS

| | | | | |
|---|---|---|---|---|
| 2006/0267402 A1* | 11/2006 | Leiter | B60T 7/107 | 303/20 |
| 2013/0213746 A1* | 8/2013 | Poertzgen | B60T 7/042 | 188/72.6 |
| 2014/0144730 A1* | 5/2014 | Schwarz | B60T 7/042 | 188/72.3 |
| 2018/0312152 A1* | 11/2018 | Barbosa | B60T 13/741 | |

FOREIGN PATENT DOCUMENTS

| | | | | |
|---|---|---|---|---|
| FR | 2928327 A1 * | 9/2009 | B60T 8/3255 |
| WO | WO-2014155182 A1 * | 10/2014 | B60T 7/12 |

* cited by examiner

METHOD FOR OPERATING AN AUTOMATED PARKING BRAKE

This application claims priority under 35 U.S.C. § 119 to patent application no. DE 10 2016 213 666.6, filed on Jul. 26, 2016 in Germany, the disclosure of which is incorporated herein by reference in its entirety.

The disclosure relates to a method for operating an automated parking brake in a motor vehicle, having a hydraulic actuator for producing a hydraulic force component and an electromechanical actuator for producing an electromechanical force component, wherein the hydraulic force component and the electromechanical force component are superposed to obtain a total clamping force for the parking brake operation, and wherein the total clamping force is maintained by self locking of the parking brake, wherein the method is characterized in that, during a parking brake operation, at least one defined hydraulic pressure level is set by means of the hydraulic actuator, wherein a defined hydraulic pressure level is locked in by means of a valve when said pressure level is reached.

BACKGROUND

Patent application DE 10 2015 208 165 A1, for example, is known from the prior art. This document relates to a method for carrying out a parking brake operation on a motor vehicle having a service brake and a parking brake, wherein a hydraulic force component and a mechanical force component are superposed to obtain a total clamping force for the parking brake operation. Here, provision is made for the superposition of the two force components to take place in each parking brake operation.

Patent application DE 10 2009 047 127 A1 is furthermore known from the prior art. This document relates to a method for operating a vehicle, in particular motor vehicle, parking brake that operates in superposition mode, wherein the braking force of the parking brake can be applied by means of two different force-producing actuators, which assist one another in the superposition mode. Provision is made for the force-producing, in particular pressure-producing, actuator to be activated for assistance even before superposition.

Methods which build up hydraulic pressure first and then apply the brake electromechanically have the difficulty of demonstrating that the hydraulic pressure is in fact also effective at the rear axle of the vehicle. Although there is a pressure sensor in the system, this measures only the pressure in the brake master cylinder. It is not possible to ensure that the measured brake pressure is actually effective at the rear axle.

Superposition of the energy from the two independent brake systems and hydraulic actuation during the clamping process itself result in several disadvantages: on the one hand, the long activation phase and large volume to be displaced mean that the energy consumption of the hydraulic actuating unit is higher than that of a conventional APB/ESP system. Since the brake pedal remains hydraulically connected to the wheel brakes in the rest position of the system, a clamping force buildup has a reactive effect on the pedal (both hydraulically and electromechanically). The large volume to be displaced can therefore be expected to lead to severe sagging of the brake pedal. However, it is desired that there should as far as possible be no discernible change for the end user at the human-machine interface (brake pedal) relative to conventional systems.

SUMMARY

In contrast, the method according to the disclosure advantageously makes it possible for the total energy consumption of a brake application process to be reduced to a necessary minimum. The sagging of the brake pedal due to this process is also reduced to a necessary minimum.

According to the disclosure, this is made possible by the features specified in the independent claims. Further embodiments of the disclosure form the subject matter of dependent claims.

The method according to the disclosure for operating an automated parking brake in a motor vehicle, having a hydraulic actuator for producing a hydraulic force component and an electromechanical actuator for producing an electromechanical force component, wherein the hydraulic force component and the electromechanical force component are superposed to obtain a total clamping force for the parking brake operation, and wherein the total clamping force is maintained by self locking of the parking brake, is characterized in that, during a parking brake operation, at least one defined hydraulic pressure level is set by means of the hydraulic actuator, wherein the defined hydraulic pressure level is locked in by means of a valve when said pressure level is reached.

The method presupposes a superposition mode of the parking brake. This should be taken to mean that the total clamping force is not produced by a single actuator but that the force of several actuators is superposed to obtain the total clamping force. During this process, there is simultaneous production of force. The available hydraulic pressure of the parking brake on its own is therefore not sufficient, for example, to obtain the required total clamping force—only the combination of the hydraulic force component (pressure level) and the electromechanical force component is sufficient. Such superposition is not performed only during a follow-up clamping process, where appropriate, or under specific operating conditions (e.g. a hot brake) but already during an initial brake application process. Thus, superposition of the hydraulic and electromechanical force components takes place during every parking brake operation.

The setting of the hydraulic pressure level is accomplished, in particular, by means of the hydraulic actuator of the service brake. Alternatively, pressure reduction of a higher feed pressure, e.g. by means of valves, is also conceivable, in particular for setting the first pressure level. A hydraulic accumulator, for example, can be regarded as a hydraulic actuator. In particular, however, this is understood to mean an electrohydraulic actuator, e.g. an electric brake booster (especially with a pedal travel sensor) or plunger (especially with a travel sensor) or an ESP pump.

While pressure (and hence a corresponding hydraulic force component) can be built up within a short time by means of the hydraulic actuator, the electromechanical actuator requires a longer time to produce the electromechanical force component (e.g. owing to the necessary traversing of the idle path). To use specific functions, e.g. monitoring of successful hydraulic pressure buildup in the brake piston, joint embodiment of the two systems is necessary in part. By means of the method described, it is possible to provide such an initial basis and to enable such functions. Maintaining the pressure level advantageously provides compensation of the two systems with their different speeds.

The total clamping force produced is then held permanently by the self locking of the parking brake or of components of the system of the parking brake, e.g. the spindle and spindle nut. By virtue of the construction, it is thus also possible to maintain the electromechanical force component, through self locking of the parking brake.

The hydraulic force component is maintained by means of a valve. This means that as soon as a defined hydraulic pressure level is reached, the hydraulic volume is trapped in the brake piston by control of one or more valves, e.g. the switchover valves of an ESP hydraulic system.

In an alternative embodiment, there can also be closure of one or more other pressure holding valves in a manner such that the hydraulic fluid volume is locked in and/or the pressure built up is held in the brake piston. The pressure acting in the brake piston is thereby maintained, i.e. held substantially constant. The pressure level mentioned is thus related, in particular, to the level of the hydraulic pressure in the brake piston. Furthermore, at least one pressure level is set during a parking brake operation. In particular, a plurality of pressure levels is advantageously set. It is advantageous in this context if a first pressure level (to hold the vehicle) and a second pressure level (for parking the vehicle) are set. When the respective pressure level is reached, this level is held constant by shutting off the switchover valves. By locking in the hydraulic fluid by means of valves, it is furthermore possible to reduce energy consumption.

In an advantageous embodiment, the method is characterized in that a first hydraulic pressure level is set when a first condition is met, wherein, in particular, the first hydraulic pressure level is defined in such a way that holding of the vehicle is made possible.

This is understood to mean that the first hydraulic pressure level is set by means of the hydraulic actuator. The term "holding" is understood and defined such that rolling of the vehicle is prevented. In contrast, the term "parking" is intended to define a situation where long-term and safe parking of the vehicle can be performed. It should be taken into account that the vehicle brake is operated in the superposition mode—as already described above. This should be understood in such a way that parking (the total clamping force to be achieved) of the vehicle can be enabled only by means of a combination of the hydraulic pressure and the electromechanical force component. This is appropriately taken into account in the definition of said second hydraulic pressure level. The target pressure of the parking brake alone is therefore insufficient for parking, but the combination of the hydraulic force component (pressure level) and the electromechanical force component is sufficient.

Owing to the planned long time period for parking, it is also necessary in this case to take account of time effects, such as the cooling of the brake disks and the associated loss of clamping force. Legal requirements are furthermore also taken into account and implemented in this case. The respectively defined target pressure therefore differs. In this case, the first hydraulic pressure level is lower than the second hydraulic pressure level. By means of the different pressure levels set, it is advantageously possible to avoid or at least mitigate conflicts of aims. Thus, for example, holding of the vehicle is possible after only a very short time period. This makes possible both safety and comfort for the user. High and long-term safety and fulfillment of legal requirements, on the other hand, are only made possible at a later point in time.

In one possible embodiment, the method is characterized in that the first condition is regarded as met when a parking brake demand is detected.

This is understood to mean that a first defined pressure level is set when the system detects that there is a parking brake demand. Alternatively, it is also possible for activation of the hydraulic actuator to be started only when the inlet valves of the front axle have been closed. Prompt activation of the hydraulic actuator in a manner appropriate to requirements is thereby advantageously achieved in order, on the one hand, to avoid unnecessary activation but likewise to allow prompt production of force when needed.

In a preferred embodiment, the method is characterized in that the inlet valves at the front axle are shut off when a parking brake demand is detected.

This is understood to mean that the hydraulic circuit of the front wheels and rear wheels is divided. A parking brake is generally positioned at the rear axle. By cutting off the brake systems of the front axle, the hydraulic volume of the circuit is reduced. This results in several advantages. For example, it makes possible a more rapid hydraulic force buildup at the braking devices of the rear axle for the same power of the hydraulic actuator. Another advantage is obtained as follows. If hydraulic pressure is built up in an automated fashion at all the braking devices of the rear axle and the front axle, a large hydraulic volume to be moved is the result, as mentioned. During such a displacement of hydraulic volume, there can be an unwanted droop (i.e. sagging) of the brake pedal. The user thus receives unwanted feedback. By decoupling a hydraulic circuit segment, an unwanted effect of this kind can be reduced, and the comfort of the driver can be enhanced. Here, decoupling the circuit of the front wheels has a significant advantage because (by virtue of the design) there are large brake pistons at the front axle, resulting in a large volume to be displaced and hence extensive sagging of the brake pedal.

In an alternative development, the method is characterized in that a second hydraulic pressure level is set when a second condition is met, wherein, in particular, the second hydraulic pressure level is defined in such a way that parking of the vehicle is made possible.

This should be understood to mean that, as already explained above, long-term and safe parking of the vehicle is advantageously made possible.

In an advantageous embodiment, the method is characterized in that the second condition is regarded as met when an idle path of the parking brake has been substantially traveled.

This is understood to mean that the hydraulic actuator is activated in order to set the second defined hydraulic pressure level as soon as the idle path of the electromechanical actuator has been traveled and a buildup of the electromechanical force component takes place or is imminent. As an alternative to the idle path traversed, it is also possible for the force buildup of the electromechanical actuator to be defined and monitored as a condition. This advantageously establishes a basis for the renewed activation of the hydraulic actuator in order to allow a joint force buildup.

In one possible embodiment, the method is characterized in that the setting of the at least one hydraulic pressure level is in each case accomplished by means of an actuation of the hydraulic actuator.

This should be understood to mean that the buildup of a defined pressure level is accomplished by means of a completed actuation of the hydraulic actuator. A plurality of pressure levels is consequently achieved by means of a plurality of actuations. Thus, for example, a buildup of two different defined pressure levels is accomplished by means of two separate activations of the hydraulic actuator. This means that, when the defined pressure level is reached or after it has been reached, the actuator is switched off. The actuations are performed with a time interval relative to each other. That is to say that there is a temporal interruption between the two activations of the actuator. It is thereby advantageously possible to avoid continuous activation of the actuator. In particular, high energy consumption must be expected owing to the long activation duration of the hydraulic unit (typically 2 to 3 seconds). This high power consumption has a negative effect on the total energy consumption, which, in turn, has to be taken into account in the energy consumption of the overall vehicle and thus should be as low as possible. By means of the method described, a reduction in energy consumption can advantageously be achieved.

In a preferred development, the method is characterized in that the actuation of the hydraulic actuator is ended when the defined hydraulic pressure level is reached and the pressure level is locked in by means of the valve.

This is understood to mean that the actuator is switched off only when the locking in of the produced pressure by means of the valves is complete. It is thereby advantageously possible to avoid an unwanted pressure loss.

In an alternative embodiment, the method is characterized in that a slope of the roadway is taken into account in the definition of the defined hydraulic pressure level, thus enabling the vehicle to be held and/or parked on the instantaneous roadway slope.

This is understood to mean that the pressure levels do not have to be defined in an absolutely fixed way. On the contrary, they can be adjusted adaptively to the environment and the driving situation. This advantageously results in a safety gain while taking into account comfort aspects (avoidance of long brake application times) and preservation of materials (in comparison with application of a maximum possible pressure level in all situations).

In an advantageous development, the method is characterized in that the shut-off valves are opened when a required total clamping force is reached.

This is understood to mean that the valves are opened only when the desired and required target clamping force has been reached. The total clamping force achieved is maintained by means of self locking of the parking brake system. The valves can therefore be opened as soon as the clamping force has been set and held by means of the parking brake. It is thereby advantageously possible to avoid unnecessary loading of the valves. Moreover, energy consumption is also optimized since the valves are moved into a deenergized position, for example.

Moreover, a control unit for operating an automated parking brake for a motor vehicle is provided, said control unit having a hydraulic actuator for producing a hydraulic force component and an electromechanical actuator for producing an electromechanical force component, wherein the hydraulic force component and the electromechanical force component are superposed to obtain a total clamping force for the parking brake operation, and wherein the total clamping force is maintained by self locking of the parking brake. According to the disclosure, this control unit is characterized in that the control unit has means and is set up such that, during a parking brake operation, at least one defined hydraulic pressure level can be set by means of the hydraulic actuator, wherein the defined hydraulic pressure level is locked in by means of one or more valves when said pressure level is reached.

This is understood to mean that the control unit is designed to carry out the method described when used as intended.

Moreover, a hydraulic brake system for a motor vehicle is provided, said system having a hydraulic actuator for producing a hydraulic force component and an electromechanical actuator for producing an electromechanical force component, wherein the hydraulic force component and the electromechanical force component are superposed to obtain a total clamping force for the parking brake operation, and wherein the total clamping force is maintained by self locking of the parking brake. According to the disclosure, said system is characterized in that the hydraulic brake system has means and is set up such that, during a parking brake operation, at least one defined hydraulic pressure level can be set by means of the hydraulic actuator, wherein the defined hydraulic pressure level is locked in by means of one or more valves when said pressure level is reached.

This is understood to mean that the hydraulic brake system is designed to carry out the method described when used as intended.

Attention is drawn to the fact that the features presented individually in the description can be combined in any technically expedient manner and can lead to further embodiments of the disclosure. Further features and the usefulness of the disclosure will become apparent from the description of illustrative embodiments with reference to the attached figures.

DETAILED DESCRIPTION

Figure 1:
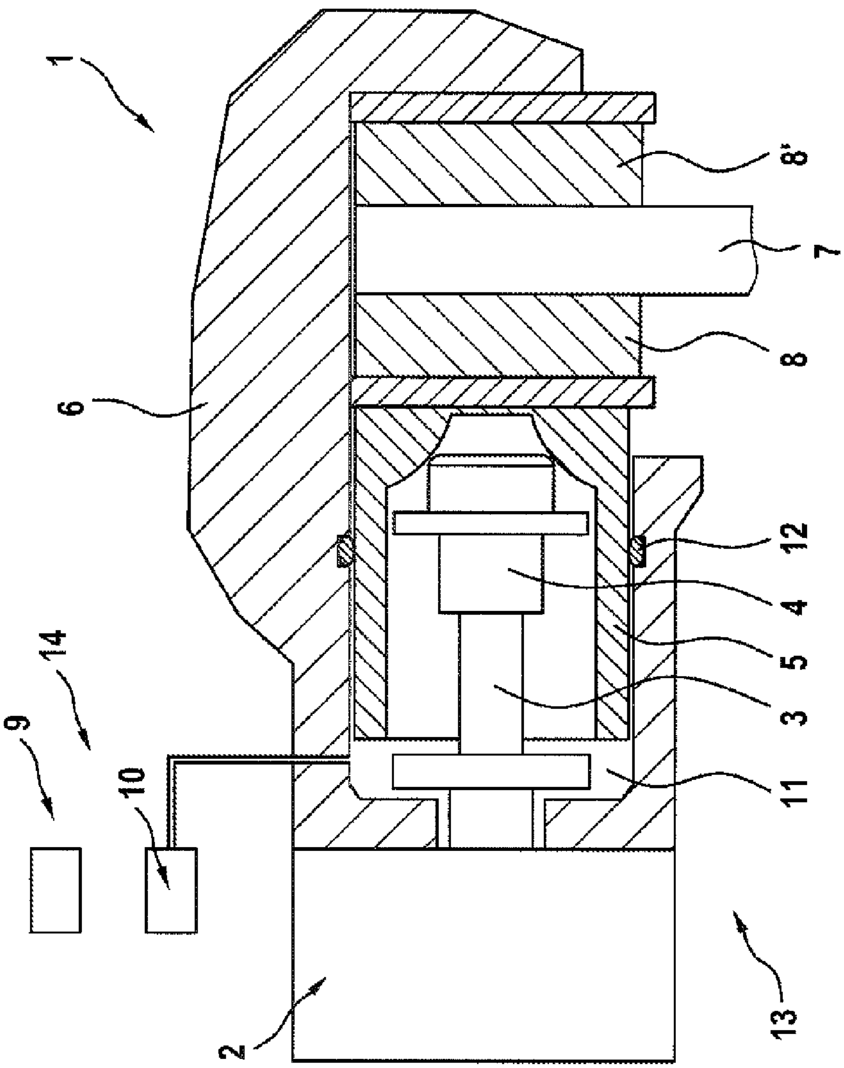
FIG. 1 shows a schematic sectional view of a braking device having an automatic parking brake of "motor on caliper" construction.

FIG. 1 shows a schematic sectional view of a braking device 1 for a vehicle. Here, the braking device 1 has an automated parking brake 13 (also referred to as an automatic parking brake or automated park brake, referred to as an APB for short), which can exert a clamping force to immobilize the vehicle by means of an electromechanical actuator 2 (electric motor). For this purpose, the electromechanical actuator 2 in the parking brake 13 illustrated drives a spindle 3, in particular a threaded spindle 3, supported in an axial direction. At its end remote from the actuator 2, the spindle 3 is provided with a spindle nut 4, which rests against the brake piston 5 in the applied state of the automated parking brake 13. In this way, the parking brake 13 transmits a force to the brake pads 8, 8' and to the brake disk 7. In this case, the spindle nut rests against an inner end of the brake piston 5 (also referred to as the rear side of the brake piston end or inner piston end). During a rotary motion of the actuator 2 and a resulting rotary motion of the spindle 3, the spindle nut 4 is moved in the axial direction. The spindle nut 4 and the brake piston 5 are supported in a brake caliper 6, which fits over a brake disk 7 in the manner of a pincer.

Respective brake pads 8, 8' are arranged on each side of the brake disk 7. In the case of a brake application process of the braking device 1 by means of the automated parking brake 13, the electric motor (actuator 2) rotates, whereupon the spindle nut 4 and the brake piston 5 are moved toward the brake disk 7 in the axial direction in order in this way to produce a predetermined clamping force between the brake pads 8, 8' and the brake disk 7. By virtue of the spindle drive and the associated self locking, a force produced in the parking brake 13 by means of an activation of the electric motor can also be maintained when the activation is ended.

The automated parking brake 13 is designed as a "motor on caliper" system, for example, as depicted, and is combined with the service brake 14. The parking brake 13 could also be regarded as integrated into the system of the service brake 14. In this arrangement, both the automated parking brake 13 and the service brake 14 act on the same brake piston 5 and on the same brake caliper 6 in order to build up a braking force on the brake disk 7. However, the service brake 14 has a separate hydraulic actuator 10, e.g. a foot brake pedal with a brake booster. In FIG. 1, the service brake 14 is designed as a hydraulic system, wherein the hydraulic actuator 10 is assisted by the ESP pump or by an electromechanical brake booster (e.g. Bosch iBooster) or can be implemented thereby. Other embodiments of the actuator 10 are also conceivable, e.g. in the form of an "IPB" (Integrated Power Brake), which fundamentally represents a brake-by-wire system, in which a plunger is used to build up hydraulic pressure. During a service braking operation, a predetermined clamping force is built up hydraulically between the brake pads 8, 8' and the brake disk 7. To build up a braking force by means of the hydraulic service brake 14, a medium 11, in particular a substantially incompressible brake fluid 11, is forced into a fluid space delimited by the brake piston 5 and the brake caliper 6. The brake piston 5 is sealed off from the environment by means of a piston sealing ring 12.

The brake actuators 2 and 10 are activated by means of one or more output stages, i.e. by means of a control unit 9, which can be a control unit of a vehicle dynamics system, such as ESP (electronic stability program), or some other control unit.

In an activation of the automated parking brake 13, the idle path or release clearance must first of all be traversed before a braking force can be built up. The term "idle path" is used, for example, to denote the distance which the spindle nut 4 must travel owing to the rotation of the spindle 3 to enter into contact with the brake piston 5. The term "release clearance" is used to denote the distance between the brake pads 8, 8' and the brake disk 7 in disk brake systems of motor vehicles. This process generally takes a relatively long time in relation to the overall activation, especially in the automated parking brake 13. At the end of a preparatory phase of this kind, the brake pads 8, 8' are applied to the brake disk 7, and the force buildup begins in a further activation. FIG. 1 shows the state of the already traversed idle path and release clearance. In this case, the brake pads 8, 8' are placed against the brake disk 7, and all the brakes, i.e. the parking brake 13 and service brake 14, can immediately build up a braking force at the corresponding wheel in the event of a subsequent activation. The descriptions relating to the release clearance apply similarly also to the service brake 14, although, owing to the high speed of the pressure buildup, the traversing of an idle path represents a smaller time outlay than in the case of the parking brake 13.

Figure 2:
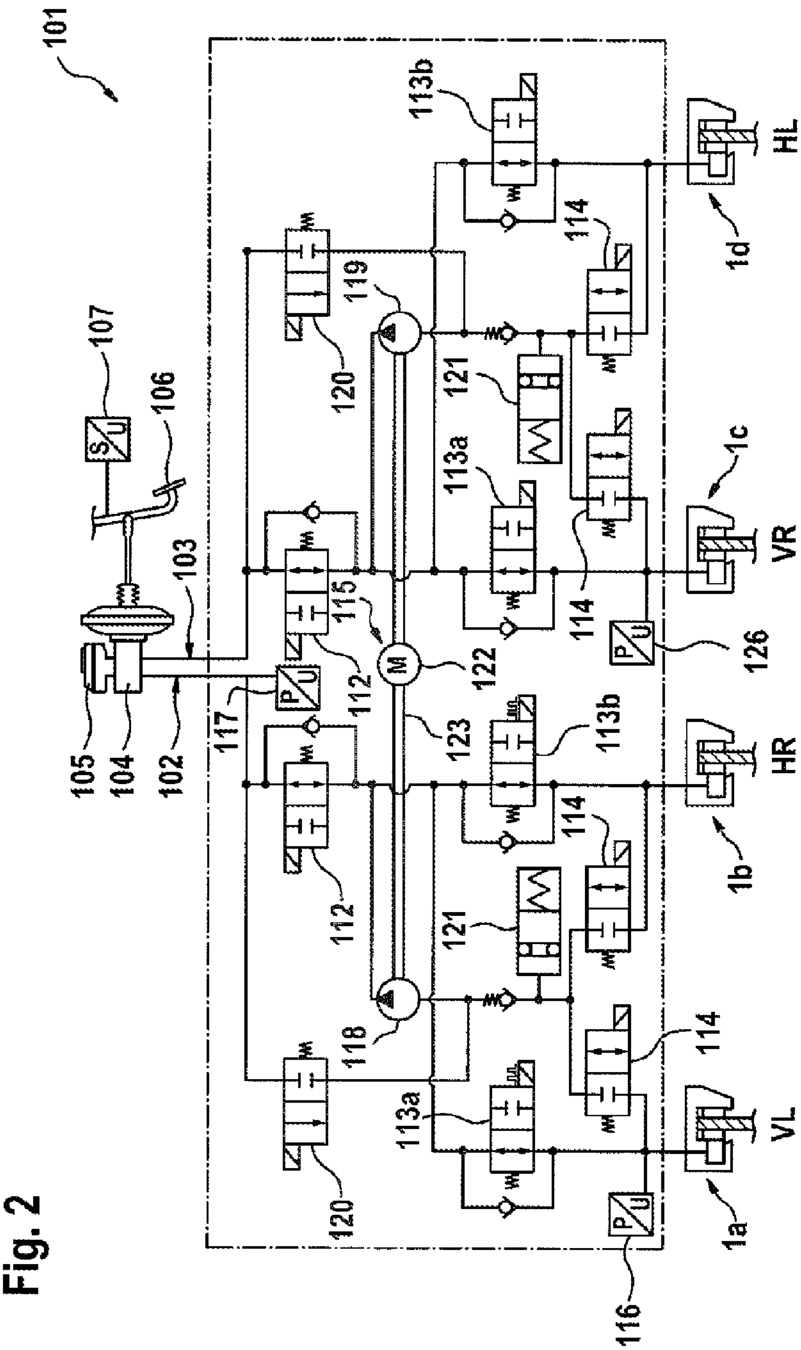
FIG. 2 shows a hydraulic circuit diagram of a vehicle brake system having a front axle brake circuit and a rear axle brake circuit and having an electronic stability program, which comprises an electric pump unit.

The hydraulic brake system, illustrated in the hydraulic circuit diagram according to FIG. 2, in a brake system 101 has a first brake circuit 102 and a second brake circuit 103 for supplying wheel brake devices 1*a* and 1*c* at the front wheels and 1*b* and 1*d* at the rear wheels with hydraulic brake fluid. In this sense, there is an X split in the brake system illustrated. As an alternative, a parallel split (II split) of the brake circuits of the brake system is, of course, also possible in a similar way. The two brake circuits 102, 103 are connected to a common brake master cylinder 104, which is supplied with brake fluid by means of a brake fluid reservoir 105. The brake master cylinder 104 is actuated by the driver via the brake pedal 106. The pedal travel performed by the driver is measured by means of a pedal travel sensor 107 in the embodiment illustrated.

Arranged in each brake circuit 102, 103 is a switchover valve 112, which is situated in the flow path between the brake master cylinder 104 and the respective wheel brake devices 1*a*, 1*b* and 1*c*, 1*d*, respectively. The switchover valves 112 are open in the deenergized home position thereof. Each switchover valve 112 is assigned a check valve connected in parallel, which allows flow in the direction of the respective wheel brake devices. Between the switchover valves 112 and the respective wheel brake devices 1*a*, 1*b* and 1*c*, 1*d*, respectively, there are inlet valves 113*a* of the front wheels and inlet valves 113*b* of the rear wheels, which are likewise open when deenergized and to which are assigned check valves, which allow flow in the opposite direction, i.e. from the wheel brake devices in the direction of the brake master cylinder.

Each wheel brake device 1*a*, 1*b* and 1*c*, 1*d* is assigned an outlet valve 114, which is closed when deenergized. The outlet valves 114 are each connected to the suction side of a pump unit 115, which has a pump 118 and 119, respectively, in each brake circuit 102, 103. The pump unit is assigned an electric drive or pump motor 122, which actuates both pumps 118 and 119 via a shaft 123. In each brake circuit, the pressure side of the pumps 118 and 119 is connected to a line segment between the switchover valve 112 and the two inlet valves 113*a*, 113*b*.

The suction sides of the pumps 118 and 119 are each connected to a main on-off valve 120, which is hydraulically connected to the brake master cylinder 104. During a control intervention into the vehicle dynamics, the main on-off valves 120, which are closed in the deenergized state, can be opened for a rapid brake pressure buildup, ensuring that the pumps 118 and 119 draw in hydraulic fluid directly from the brake master cylinder 104. This brake pressure buildup can be carried out independently of an actuation of the brake system by the driver. The pump unit 115 with the two individual pumps 118 and 119, the electric pump motor 122 and the shaft 123 belongs to a driver assistance system and, in particular, forms an electronic stability program (ESP).

In each brake circuit 102, 103, there is a hydraulic accumulator 121 between the outlet valves 114 and the suction side of the pumps 118 and 119, said accumulator being used for temporary storage of brake fluid, which is released from the wheel brake devices 1*a*, 1*b* and 1*c*, 1*d*, respectively, through the outlet valves 114 during an intervention into the vehicle dynamics. Each hydraulic accumulator 121 is assigned a check valve, which opens in the direction of the suction sides of the pumps 118, 119. To measure the pressure, there is a respective pressure sensor 116 in each brake circuit 102, 103 in the region of the wheel brake devices 1*a*, 1*b* and 1*c*, 1*d*, respectively, in the embodiment illustrated. A further pressure sensor 117 is arranged in brake circuit 102, adjacent to the brake master cylinder 104.

Figure 3:
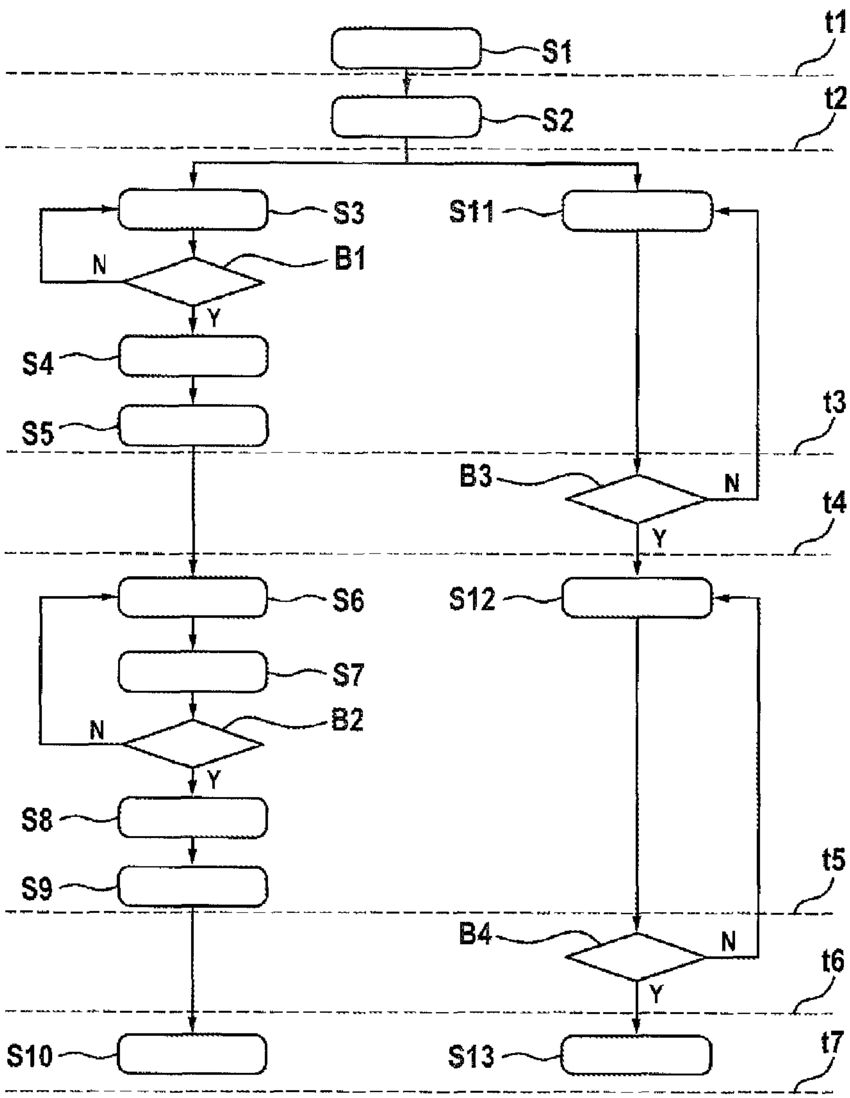
FIG. 3 shows an illustration of the method steps in one embodiment of the disclosure.

FIG. 3 shows an illustration of the method steps of one embodiment of the disclosure. Here, a parking brake demand is determined in a first step S1. At time t1, a parking brake demand is recorded. Initially, the inlet valves 113*a* of the front axle (shutoff valves) are thereupon closed in a step S2. Once the inlet valves 113*a* of the front axle are fully closed, both the electromechanical actuator of the parking brake and the hydraulic actuator of the service brake are actuated at time t2. A hydraulic pressure buildup takes place in a step S3. By virtue of its high speed, the hydraulic actuator makes available the necessary holding force here just after the beginning of actuation. Whether the pressure level p1 required to hold the vehicle has been reached is interrogated in a condition B1. If this has not yet been reached (N), a further hydraulic pressure buildup takes place. If it has been reached (Y), the switchover valves 112 are closed in a step S4. In a step S5, the activation of the hydraulic actuator is then ended. The hydraulic brake pressure is then held automatically by the closed switchover valves. In an alternative embodiment, closure of one or more other pressure holding valves can also take place in such a way that the hydraulic fluid volume is locked in and/or the built-up pressure in the brake piston is held. At time t3, the hydraulic actuation is ended for the time being.

At time t2, actuation of the parking brake furthermore starts in a step S11. Driven by the electromechanical actuator, the actuating unit begins to traverse the available idle path. During this process, no hydraulic volume is displaced since the spindle nut moves only within the brake piston. In order to avoid a high load on the onboard electrical system from two simultaneously actuated systems, the electromechanical actuators of the parking brake can also be activated in a somewhat time-delayed manner. A typical value for this is a time offset of approximately 40 ms. While the parking brake traverses the idle path necessary for a brake system which is free from residual braking torque in normal operation, a condition B3 is used to check whether the idle path has been traversed. If this is not the case (N), activation of the electromechanical actuator is continued. Once the parking brake has traversed the idle path at time t4 (condition B3=Y), an electromechanical force buildup takes place in a step S12.

During this process, there is force superposition of the hydraulic and electromechanical force components. The resulting movement of the brake piston leads to a pressure drop in the hydraulic fluid owing to the volume displacement. This pressure drop is compensated by the hydraulic actuator. The hydraulic force buildup furthermore starts again in step S6 with a pressure increase from p1 to p2. For this purpose, the switchover valves 112 are opened in a step S7. During this process, a parking brake pressure p2 is set. In the process, condition B2 is interrogated to determine whether this pressure p2 has been reached. If this is not the case (N), the hydraulic pressure buildup is continued. If this is the case (Y), the switchover valves 112 are shut off again in a step S9. In a step S9, the hydraulic pressure buildup is then ended. If the hydraulic clamping force component p2 necessary for the overall brake application process has been reached at time t5, the pressure is held by closing the switchover valves 112 again in the rear wheel brakes.

During the electromechanical force buildup, a condition B4 is used to check whether the required target clamping force has been achieved. If this is not the case (N), the activation of the electromechanical actuator is continued. If this is the case (Y), this leads to ending of the activation. At time t6, the sum of the hydraulic and electromechanical clamping force components is present at the braking piston of the rear wheel brake. This state can be detected inter alia by monitoring the spindle nut travel of the park brake actuators. The power supply to the parking brake is switched off and all the valves (switchover valves, inlet valves, other shutoff valves) of the hydraulic brake system are opened. At time t7, the hydraulic pressure has completely escaped and the park brake actuation process is thus complete. By virtue of the self locking design of the spindle/spindle nut unit of the parking brake, the clamping force is maintained automatically and permanently without the need for additional energy.

Figure 4:
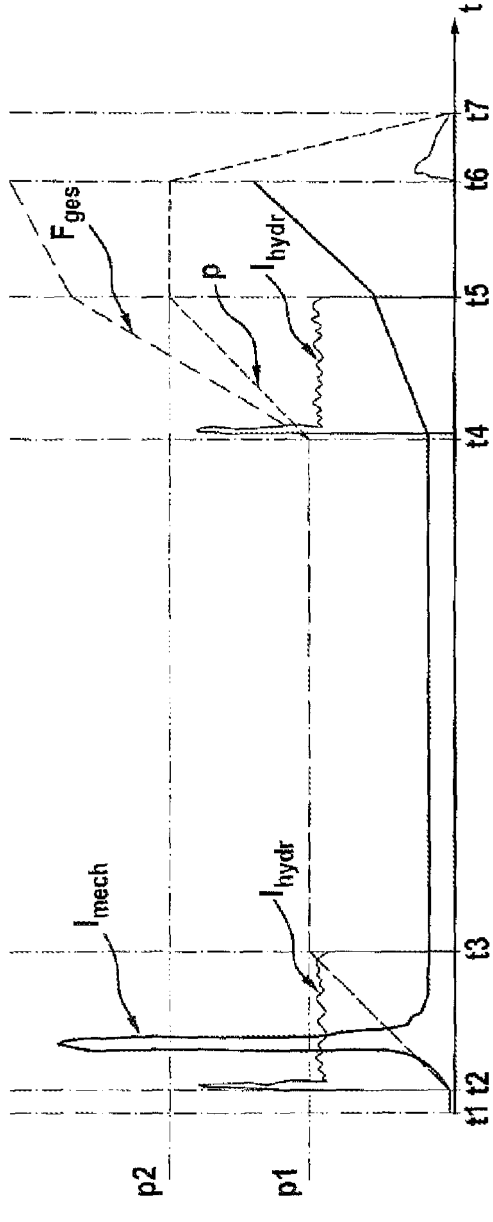
FIG. 4 shows a diagram containing the time-dependent variation in the motor current of the electromechanical actuator and of the hydraulic actuator, in the brake pressure and in the total braking force.

FIG. 4 shows a diagram comprising electric and hydraulic state variables during a brake application process for immobilizing the vehicle at rest. At time $t_1$, a hydraulic brake pressure p is produced by means of an electrically controllable hydraulic actuator of the hydraulic vehicle brake, e.g. by actuation of the ESP pump. During this process, $I_{hydr}$ shows the variation of the current of the hydraulic actuator. Initially, this rises abruptly upon activation (startup spike). Until a first pressure level $p_1$ is reached, the current remains substantially constant at a defined level. At time $t_3$, the hydraulic brake pressure reaches the first level $p_1$.

At time $t_2$, the energization of the electric brake motor (electromechanical actuator) begins, with the motor current $I_{mech}$ (i.e. current of the electromechanical actuator), which, after an initial pulse, falls to an idle current and maintains this over the time period between $t_3$ and $t_4$. The phase between $t_3$ and $t_4$ represents the idling phase of the electric brake motor. As long as the idle path is being traversed, the pressure p is held constant at the pressure level $p_1$. For this purpose, the hydraulic fluid is locked in by means of valves. Control of the hydraulic actuator is no longer necessary for this time period.

At time $t_4$, an electromechanical braking force is produced by means of the electric brake motor, and the motor current $I_{mech}$ rises in corresponding fashion, starting from the level of the idle current. There is furthermore a renewed actuation of the hydraulic actuator with a current $I_{hydr}$ in order to set the desired second pressure level $p_2$. In this case, the hydraulic brake pressure p rises further, starting from the first level $p_1$, resulting in a total braking force $F_{ges}$ through superposition of the hydraulic and the electromechanical braking force.

At time $t_5$, the hydraulic brake pressure reaches its maximum $p_2$, which is maintained until time $t_6$. In the time period between $t_5$ and $t_6$, the hydraulic pressure level $p_2$ reached is once again maintained by locking in the hydraulic fluid by means of valves. As an alternative, it can be held constant and adjusted by control of the hydraulic actuator. This is accomplished with a reduced current $I_{hydr}$. In the time period between $t_5$ and $t_6$, the electromechanical braking force continues to rise, changing synchronously with the braking current $I_{mech}$, until a maximum is reached. The hydraulic pressure is then released or the hydraulic actuator switched off.

What is claimed is:

1. A method for operating an automated parking brake in a motor vehicle, having a hydraulic actuator for producing a hydraulic force component and an electromechanical actuator for producing an electromechanical force component, the method comprising:

superimposing the hydraulic force component and the electromechanical force component to obtain a total clamping force for a parking brake operation;

maintaining the total clamping force by self-locking of the automated parking brake;

setting, during the parking brake operation, at least one defined hydraulic pressure level with the hydraulic actuator;

locking-in the at least one defined hydraulic pressure level with a valve when the at least one defined hydraulic pressure level is reached;

detecting a parking brake demand; and shutting off inlet valves at the front axle when the parking brake demand is detected.

2. The method according to claim 1, further comprising:
setting a first hydraulic pressure level of the at least one defined hydraulic pressure level when a first condition is met,
wherein the first hydraulic pressure level is defined as a pressure for holding the vehicle.

3. The method according to claim 2, further comprising:
setting a second hydraulic pressure level of the at least one defined hydraulic pressure level when a second condition is met,
wherein the second hydraulic pressure level is defined as a pressure for parking the vehicle.

4. The method according to claim 3, further comprising:
setting the first hydraulic pressure level and the second hydraulic pressure level with actuation of the hydraulic actuator.

5. The method according to claim 1, further comprising:
ending actuation of the hydraulic actuator when the at least one defined hydraulic pressure level is reached and the at least one defined hydraulic pressure level is locked-in with the valve.

6. The method according to claim 3, further comprising:
taking into account a slope of a roadway in a definition of the at least one defined hydraulic pressure level to enable the vehicle to be held and/or parked on an instantaneous roadway slope.

7. The method according to claim 1, further comprising:
opening shut-off valves when the total clamping force is reached.

8. A method for operating an automated parking brake in a motor vehicle, having a hydraulic actuator for producing a hydraulic force component and an electromechanical actuator for producing an electromechanical force component, the method comprising:
superimposing the hydraulic force component and the electromechanical force component to obtain a total clamping force for a parking brake operation;
maintaining the total clamping force by self-locking of the automated parking brake;
setting, during the parking brake operation, at least one defined hydraulic pressure level with the hydraulic actuator;
locking-in the at least one defined hydraulic pressure level with a valve when the at least one defined hydraulic pressure level is reached;
setting a first hydraulic pressure level of the at least one defined hydraulic pressure level when a first condition is met, wherein the first hydraulic pressure level is defined as a pressure for holding the vehicle;
detecting a parking brake demand; and
determining that the first condition is met when the parking brake demand is detected.

9. A method for operating an automated parking brake in a motor vehicle, having a hydraulic actuator for producing a hydraulic force component and an electromechanical actuator for producing an electromechanical force component, the method comprising:
superimposing the hydraulic force component and the electromechanical force component to obtain a total clamping force for a parking brake operation;
maintaining the total clamping force by self-locking of the automated parking brake;
setting, during the parking brake operation, at least one defined hydraulic pressure level with the hydraulic actuator;
locking-in the at least one defined hydraulic pressure level with a valve when the at least one defined hydraulic pressure level is reached;
setting a first hydraulic pressure level of the at least one defined hydraulic pressure level when a first condition is met, wherein the first hydraulic pressure level is defined as a pressure for holding the vehicle;
setting a first hydraulic pressure level of the at least one defined hydraulic pressure level when a first condition is met, wherein the first hydraulic pressure level is defined as a pressure for holding the vehicle;
setting a second hydraulic pressure level of the at least one defined hydraulic pressure level when a second condition is met, wherein the second hydraulic pressure level is defined as a pressure for parking the vehicle; and
determining that the second condition is met when an idle path of the parking brake has been substantially traveled.

10. A control unit for operating an automated parking brake for a motor vehicle having a hydraulic actuator configured to produce a hydraulic force component, and an electromechanical actuator configured to produce an electromechanical force component, the control unit comprising:
a non-transitory computer readable medium having program instructions configured to cause the control unit
to superimpose the hydraulic force component and the electromechanical force component to obtain a total clamping force for a parking brake operation,
to maintain the total clamping force by self-locking of the automated parking brake,
to set, during the parking brake operation, at least one defined hydraulic pressure level with the hydraulic actuator,
to lock-in the at least one defined hydraulic pressure level with a valve when the at least one defined hydraulic pressure level is reached,
to detect a parking brake demand; and
to shut off inlet valves at the front axle when the parking brake demand is detected.

11. A hydraulic brake system for a motor vehicle, comprising:
a hydraulic actuator configured to produce a hydraulic force component;
an electromechanical actuator configured to produce an electromechanical force component; and
a control unit configured
to superimpose the hydraulic force component and the electromechanical force component to obtain a total clamping force for a parking brake operation,
to maintain the total clamping force by self-locking of the automated parking brake,
to set, during the parking brake operation, at least one defined hydraulic pressure level with the hydraulic actuator,
to lock-in the at least one defined hydraulic pressure level with a valve when the at least one defined hydraulic pressure level is reached,
to detect a parking brake demand; and
to shut off inlet valves at the front axle when the parking brake demand is detected.

* * * * *